United States Patent
Taylor et al.

[11] 3,910,757
[45] Oct. 7, 1975

[54] MOBILE TOBACCO CURING AND DRYING SYSTEM

[76] Inventors: Miller Taylor, Rt. 1, Box 118;
Jimmy N. Taylor, Rt. 1, Box 107;
Oren M. Taylor, Rt. 1, Box 117A,
all of Elizabethtown, N.J. 28337

[22] Filed: Aug. 30, 1974

[21] Appl. No.: 501,960

Related U.S. Application Data

[63] Continuation of Ser. No. 389,087, Aug. 17, 1973.

[52] U.S. Cl. .................. 432/500; 98/6; 98/55; 34/233; 296/137 B
[51] Int. Cl.² ...................................... A24B 1/02
[58] Field of Search ............. 432/500, 93, 162, 168, 432/169, 241; 98/6, 8, 10, 52–56; 34/212, 213, 218, 227, 231, 233, DIG. 12, 170; 62/239, 240; 296/51, 55, 56, 57 R, 68, 137 B

[56] References Cited
UNITED STATES PATENTS

| | | | |
|---|---|---|---|
| 1,344,057 | 6/1920 | Moore | 98/6 |
| 1,952,883 | 3/1934 | Nelson | 296/51 |
| 2,159,406 | 5/1939 | Schwebs | 98/6 |
| 2,293,316 | 8/1942 | Stebbins | 98/6 |
| 2,439,487 | 4/1948 | Reilly | 98/6 |
| 2,843,422 | 7/1958 | Black | 296/137 B |
| 2,983,500 | 5/1961 | Finley et al. | 432/36 |
| 3,329,416 | 7/1967 | Jackson | 432/49 |
| 3,367,643 | 2/1968 | Copeland, Jr. | 432/500 |
| 3,472,548 | 10/1969 | Comisac | 296/56 |
| 3,731,968 | 5/1973 | Duffield | 296/137 B |

Primary Examiner—John J. Camby
Assistant Examiner—Henry C. Yuen
Attorney, Agent, or Firm—Sughrue, Rothwell, Mion, Zinn & Macpeak

[57] ABSTRACT

A mobile fan and burner unit is provided with a four-sided plenum chamber having an air return duct adjacent the top and an air supply duct adjacent the bottom of each side thereof. The return and supply ducts are connected to top and bottom apertures respectively in the rear of a mobile barn having wheels and a tow bar. Each mobile barn is provided with a supply plenum chamber beneath a perforated floor and a peaked roof to provide a return air plenum. Each barn is provided with access doors at the front of the trailer to facilitate the loading of tobacco curing racks and the roof panels are hinged to facilitate the loading of bulk crops. Portable hoist means may be mounted on the tow bar to facilitate loading and unloading of the tobacco racks.

5 Claims, 6 Drawing Figures

MOBILE TOBACCO CURING AND DRYING SYSTEM

This is a continuation of application Ser. No. 389,087, filed Aug. 17, 1973.

BACKGROUND OF THE INVENTION

1. Field of the Invention

The present invention is directed to a portable curing and drying system for tobacco or other bulk crops and more particularly to a portable fan and heater unit which can simultaneously be connected to a plurality of portable barns.

2. Prior Art

At the present time, tobacco of the flue cured type is handled to a large extent manually during harvesting and curing operations. After the tobacco is picked, the leaves are handled manually by first placing them in bunches with their stems commonly aligned and tying these bunches, called "hands," by string or other instrumentality on elongated tobacco sticks. This operation can take place either directly in the field or at the barn location and the sticks are then raised into position within the tobacco barn for curing.

In recent years, bulk handling racks have been developed which are capable of supporting a large quantity of tobacco leaves but even after these bulk curing racks have been loaded they must still be transported substantial distances to a suitable curing barn. A considerable amount of labor is then expanded in transferring the bulk curing racks from the transport means into the curing barns.

SUMMARY OF THE INVENTION

According to the present invention, a mobile bulk curing and drying system is provided which will substantially decrease the amount of handling of the tobacco or other crops and accordingly reduce the number of man hours required.

According to the present invention, a mobile bulk curing and drying system is provided which can be located in close proximity to the tobacco field and be readily transported from one area to another.

According to the present invention, a mobile bulk curing and drying system is provided wherein the portable tobacco barn may be loaded directly in the field, transported a short distance to a mobile forced hot air unit for connection thereto and subsequently be towed to any suitable location for unloading and storage prior to sale. As a result, a considerable amount of tobacco handling is eliminated between the field and the warehouse.

According to the present invention, a mobile forced hot air drying unit is provided with connections which will allow a plurality of portable barns to be simultaneously connected thereto for bulk curing and drying.

According to the present invention, a portable barn is provided which is fitted with wheels and a tow bar to facilitate the transport thereof. Each portable barn is provided with suitable connecting means for connection to the mobile forced hot air drying unit as well as supply and return plenums and a perforated floor to provide for complete circulation of hot air through the portable barn. Each barn is provided with doors adjacent the tow bar and a portable winch can be mounted on the tow bar to facilitate the loading of bulk tobacco curing racks onto suitable guide rails within the portable barn. Each barn is also provided with pivoted roof members to allow for the loading of other bulk crops such as peanuts, corn, grain and hay directly in the field.

The foregoing and other objects of the present invention will become more apparent during the course of the following detailed description of the present invention with reference to the accompanying drawings.

DETAILED DESCRIPTION OF THE INVENTION

Figure 1:
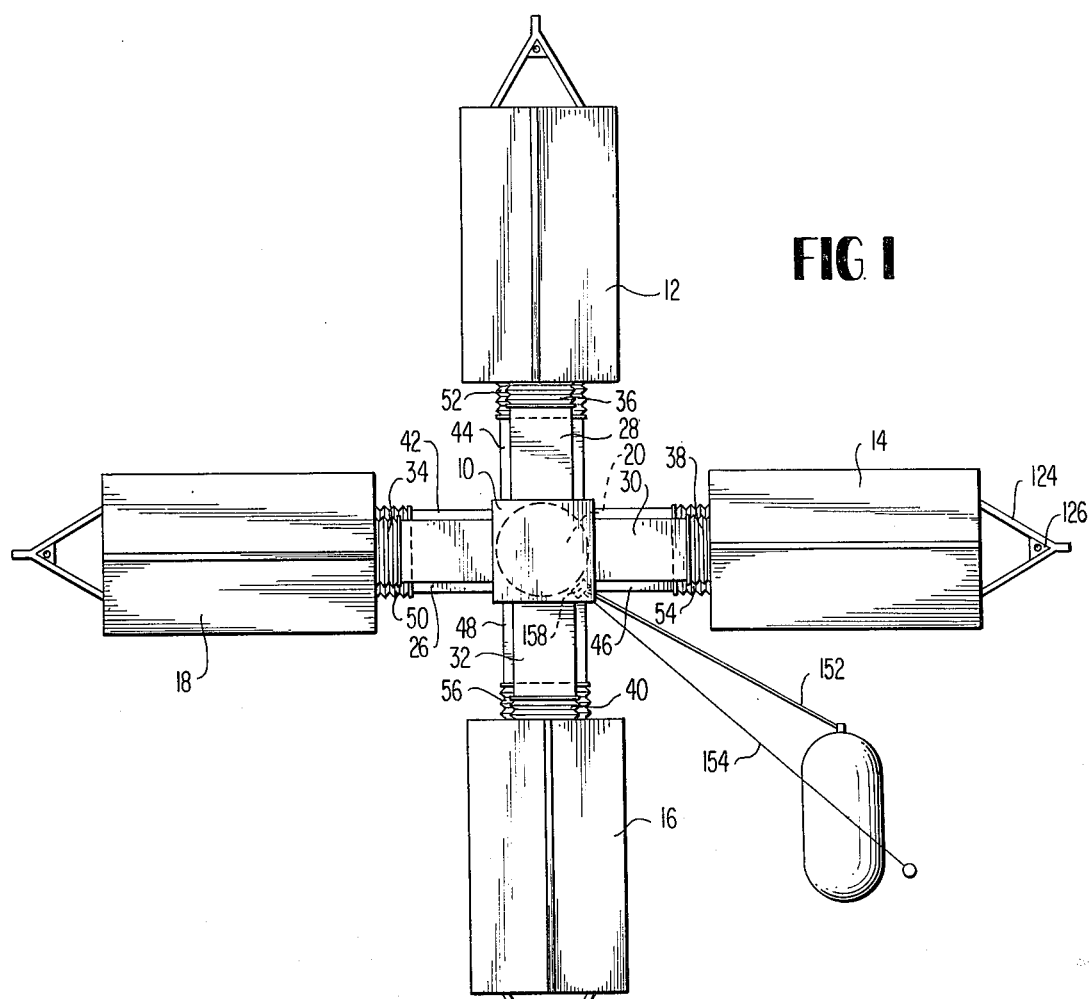
FIG. 1 is a top plan view of the mobile drying system according to the present invention showing four portable barns connected to a central fan and burner unit.
Figure 2:
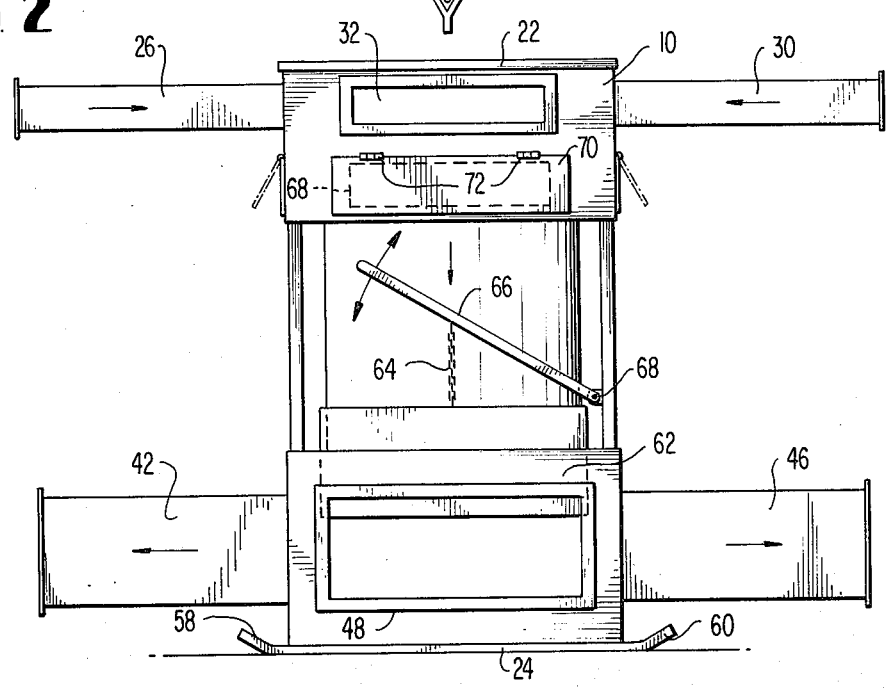
FIG. 2 is a side elevation view of the fan and burner unit per se.

In FIG. 1, the fan and burner unit 10 is shown with four portable barns 12, 14, 16 and 18 connected thereto in operable relation for curing and drying crops such as tobacco, corn, peanuts or grain. The fan and burner unit is comprised of a substantially rectilinear chamber having the fan and burner unit centrally disposed as indicated in phantom lines in FIG. 1 at 20. The rectilinear chamber is provided with a top 22 and a bottom 24 to define an enclosed plenum chamber. Adjacent the top of the fan and burner unit 10 are four return ducts 26, 28, 30 and 32 which may be connected to each of the mobile barns or trailers by means of a flexible conduit 34, 36, 38 and 40 respectively. Adjacent the bottom of the fan and burner unit 10, are four supply ducts 42, 44, and 46 and 48 which are in turn connected to the mobile barns or trailers 12, 14, 16 and 18 by flexible conduits 50, 52, 54 and 66, respectively. The bottom 24, as shown in FIG. 2, is provided with turned up ends 58 and 60 so that the bottom is formed as a skid to assist in transporting the fan and burner unit. It is also conceivable that suitable provisions may be made for mounting wheels on the fan and burner unit to transport same from one location to another.

In order to control the flow of heated air through the fan and burner unit 10, a gate or sliding panel 62 is provided for each of the outlets or supply ducts 42, 44, 46 and 48. As shown in FIG. 2, only one gate or sliding panel is shown but the arrangement would be identical for the other three. The gate 62 is raised and lowered by means of a chain 64 connected to a suitable handle 66 pivoted at 68 on the frame of the unit 10. The gate 62 may be provided with suitable guide means either inside or outside of the wall of the unit. If the gate 62 is guided for sliding movement within the chamber defined by the unit 10, the gate 62 would pass through a close fitting slot to the inside of the plenum chamber having suitable sealing means to prevent loss of air. Suitable locking means (not shown) can be provided to hold the gate open. Immediately below each of the return ducts 26, 28, 30 and 32 is a vent aperture 68 closed by means of a cover plate 70 which is hinged to the unit housing 10 at 72. Only one of these hinged vents is shown in FIG. 2 but identical vents would be provided directly beneath each of the return ducts.

Each of the vent covers is freely supported to regulate the internal pressure of the unit 10.

Figure 3:
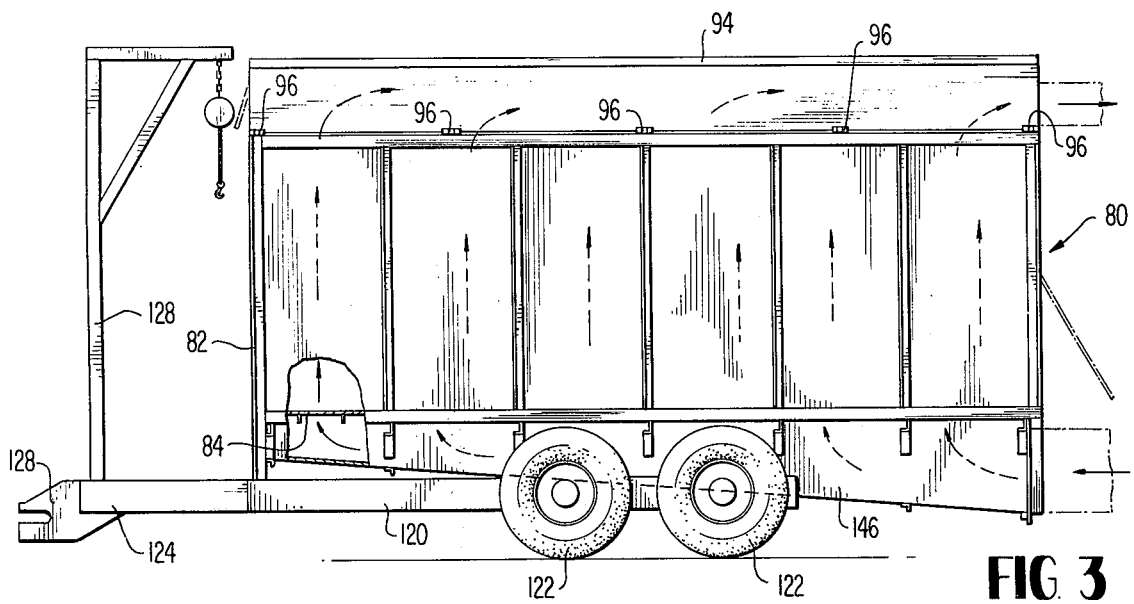
FIG. 3 is a side elevation view, partly in section, of a portable barn.
Figure 4:
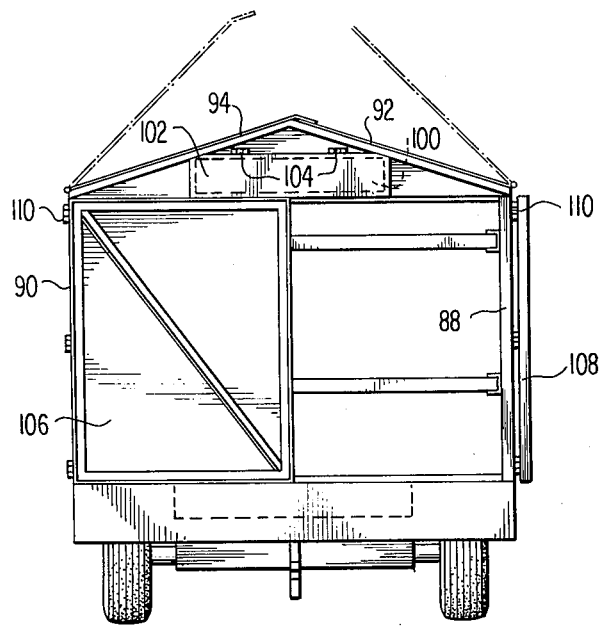
FIG. 4 is a front elevation view of a portable barn.

A portable barn or trailer 80 is shown in FIG. 3 and is comprised of a substantially rectilinear body 82. The body includes a perforated floor plate 84 which is shown in greater detail in FIG. 6, two longitudinal side panels 88 and 90 and two hinged roof panels 92 and 94 which are pivoted to the body at 96. The front wall 98 of the trailer is provided with an aperture 100 which is closed by means of a freely suspended hinge cover 102 which is hinged at 104. This vent regulates the internal pressure within the portable barn. The remainder of the front end of trailer is closed by two doors 106 and 108 which are hinged to the side walls at 110. These doors may be opened to facilitate the loading of the tobacco racks 112 and 114 on longitudinal side channels 116 and 118 respectively. The portable barn is provided with a supporting frame 120 and a plurality of wheels 122 which are journaled on suitable axles supported in the frame 120. The front of the frame 120 is formed into a triangular tow bar 124 having a coupling 126 on the forward end thereof. The tow bar is provided with a triangular plate 126 having a post thereon for the reception of a suitable hoist 128 which will assist in hoisting the tobacco racks into position for insertion into the portable barn.

Figure 5:
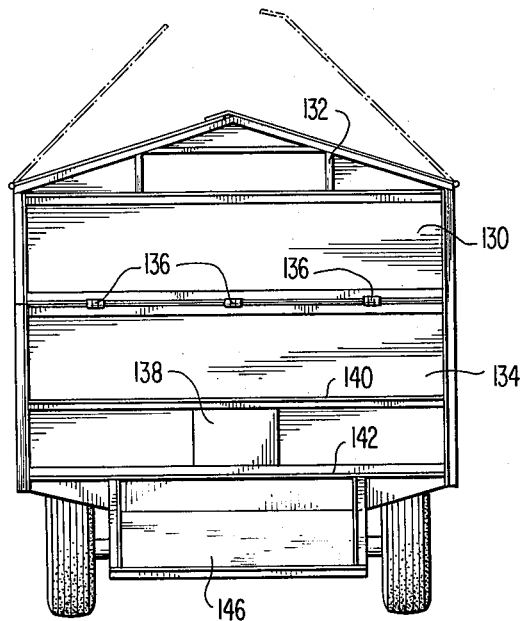
FIG. 5 is a rear elevation view of a portable barn.

The rear of the trailer as shown in FIG. 5, is provided with a stationary upper portion 130 having an aperture 132 therein which is adapted to mate with the flexible couplings on the return air ducts connected to the fan and burner unit 10. The lower half of the rear wall 134 is hinged for vertical swinging movement about a horizontal axis at 136. The hinged panel 134 is provided with an aperture covered by a sliding inspection door 138 guided by rails 140 and 142 on the face of the panel 134.

Figure 6:
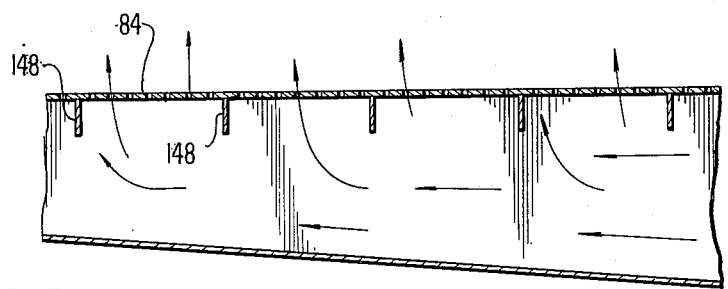
FIG. 6 is a partial detailed view, in section, of the supply plenum for a portable barn.

A tapered plenum chamber 146 is provided beneath the floor of the portable barn and the plenum is closed at the front end of the trailer and open at the rear end of the trailer for connection to the flexible couplings on the supply ducts connected to the fan and burner unit 10. As best seen in FIGS. 3 and 6, a plurality of downwardly extending baffles 148 are provided on the underside of the perforated floor plate 84 to aid in guiding the forced hot air upwardly through various portions of the mobile barn.

In order to heat the air within the unit 10, the burner unit 20 may be of any suitable type such as a gas, oil or electric heater unit. If the unit is gas or oil fueled it would be necessary to provide a fuel supply 150 with a suitable connection 152 between the fuel supply and the burner unit. An electrical lead in wire 154 from a nearby utility pole 156 is also provided for supplying the necessary electrical power to operate the fan associated with the burner unit. A suitable control box or panel 158 may be provided on the fan of burner unit 10 at any suitable location.

In the operation of the mobile drying system according to the present invention, assuming the crop to be dried is tobacco, the tobacco leaves would be picked in the field and immediately be joined into "hands" and placed on the bulk drying racks. By using the portable hoist 128 mounted on the front of the portable trailer or barn, a single operator could position the racks for transfer onto the longitudinal rails 116 or 118 within the portable barn whereupon they would be slid into position. Once the portable barn was filled with tobacco, the front doors 106 and 108 will be closed and locked by any suitable means and the portable barn will be transported to the location of the nearest portable fan and burner unit 10. The portable barn will be backed up to one side of the unit 10 and the appropriate return and supply ducts would be connected to the respective flexible couplings to the return duct opening 132 and the supply plenum 146 of the portable barn. The respective gate 62 would be raised to allow communication between the supply plenum 146 and the interior of the fan burner unit 10. With the top panels 92 and 94 and the rear panel 134 disposed in the closed position, the burner and fan unit would be operated to produce a circlating supply of hot air through the supply ducts, the plenum chamber, the floor of the portable barn, and the return ducts to the burner unit 10. If a portable barn was not present at any of the openings of the fan and burner unit 10, the respective gate 62 would be closed to prevent the loss of hot air. As indicated previously, the hinged vent covers 102 and 70 would regulate the internal pressure of the portable barn and the fan burner unit respectively.

The present system could also be used for drying other crops such as corn, grain or peanuts. In order to load these crops into the portable barn, it would be necessary to open the hinged top panels 92 and 94 while maintaining the front doors 106 and 108 and the rear panel 134 in the closed position. After the portable barn is filled with the particular crop, the top panels would be closed and the trailer would be hooked up to the fan and burner unit 10 in the same manner as indicated previously with respect to a tobacco crop. After such a bulk crop has been dried, the trailer may be transported to a suitable unloading position and the rear panel 134 may be raised to allow the dumping of the load from the portable barn. The sliding door 138 which covers a small opening in the panel 134 can be used either as an inspection opening or as a controlled outlet spout during a dumping operation of a bulk crop.

While the portable barns shown in the drawings have only two hinged top panels it is contemplate that each panel could be further divided into a plurality of hinged panels to provide limited access to the interior also removable dividers could be inserted in each portable barn to provide separate sections for accommodating more than one crop simultaneously.

While the invention has been particularly shown and described with reference to a preferred embodiment thereof, it will be understood by those skilled in the art that various changes in form and details may be made therein without departing from the spirit and scope of the invention.

What is claimed is:

1. A mobile drying apparatus comprising a central fan and heating means including a housing defining a vertically disposed plenum chamber having a plurality of return ducts connected to the top of said chamber and a plurality of supply ducts connected to the bottom of said chamber, portable barn means having a top, a bottom, side walls, a front end and a rear end, wheels mounted on said barn means and tow bar means connected to the front end of said portable barn means, said portable barn means having closable access means on said top and closable access means on said rear end thereof and means for connecting said return and supply ducts to said rear end of said portable barn means above and below said closable access means on said rear end for circulating hot air from said fan and heating means through said portable barn means and back to said fan and heating means.

2. A mobile drying apparatus as set forth in claim 1, wherein said closable access means on said top is comprised of a pair of hinged roof panels disposed in overlapping relation and said closable access means on said rear end is comprised of a hinged rear panel mounted for vertical movement about a horizontal axis, and further comprising additional closable access means on said front end including a pair of hinged front panels adapted to close the front end of said barn means.

3. A mobile drying apparatus as set forth in claim 2 wherein said hinged rear panel is provided with an inspection opening and sliding panel means adapted to be disposed in closing relation with respect to said opening.

4. A mobile drying apparatus as set forth in claim 2 wherein said portable barn is provided with a perforated floor spaced from the bottom of said barn, plenum means extending beneath said floor for connection with said supply duct whereby the hot air from said fan and heating means is distributed upwardly from said plenum through said perforated floor.

5. A mobile drying apparatus as set forth in claim 2 further comprising hoist means detachably mounted on said tow bar means to assist in loading and unloading goods to be dried through said front panels.

* * * * *